Figure 1:
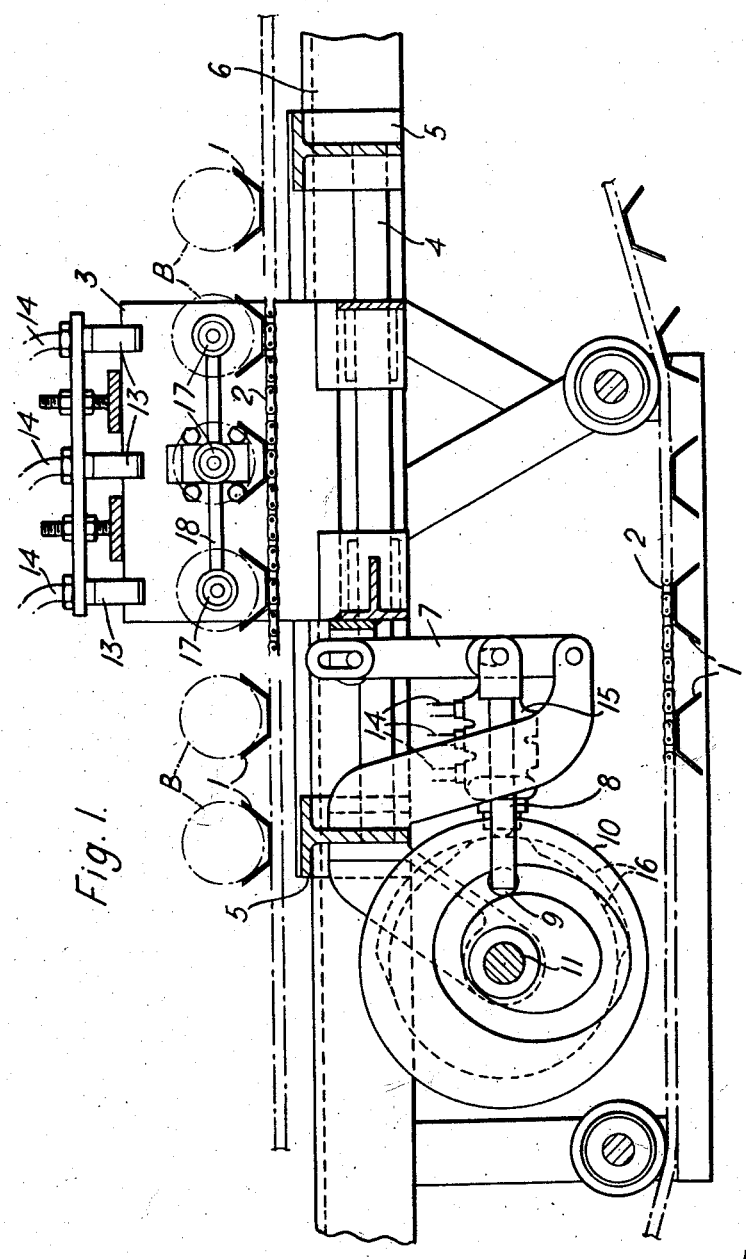

Inventor
JOHN KALMAN

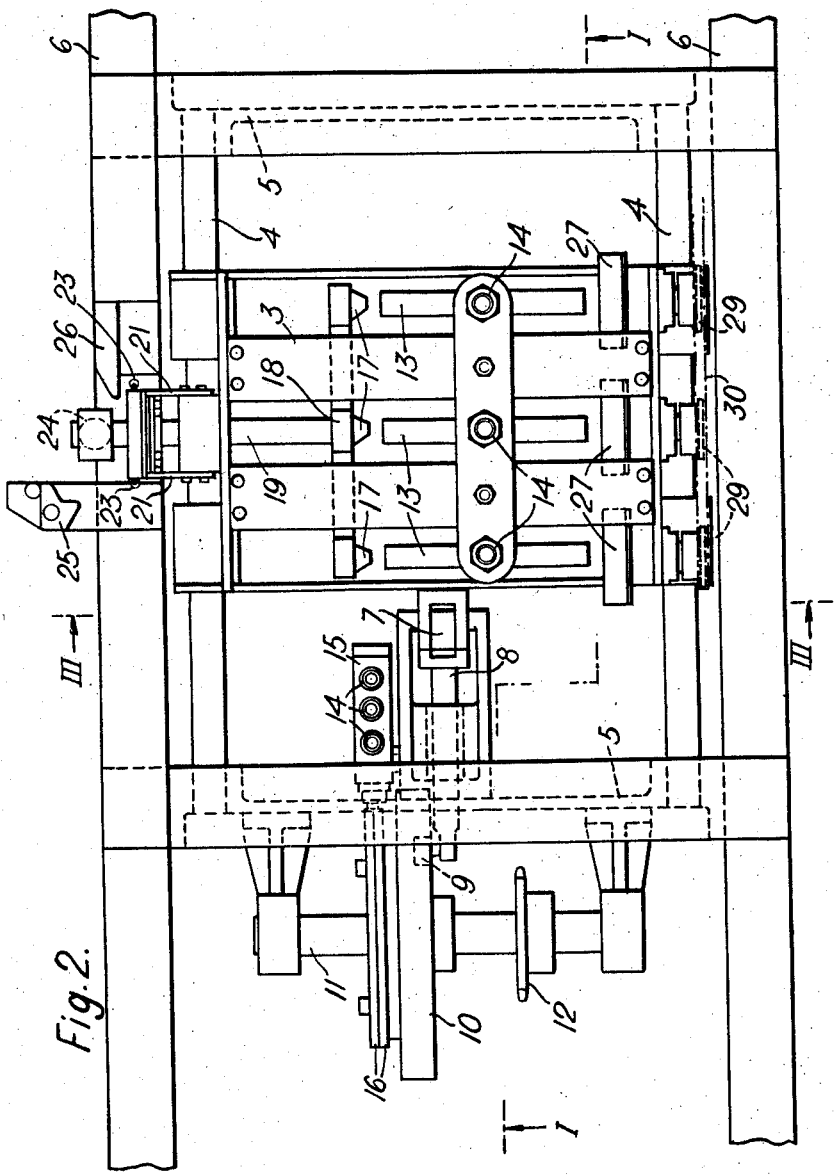

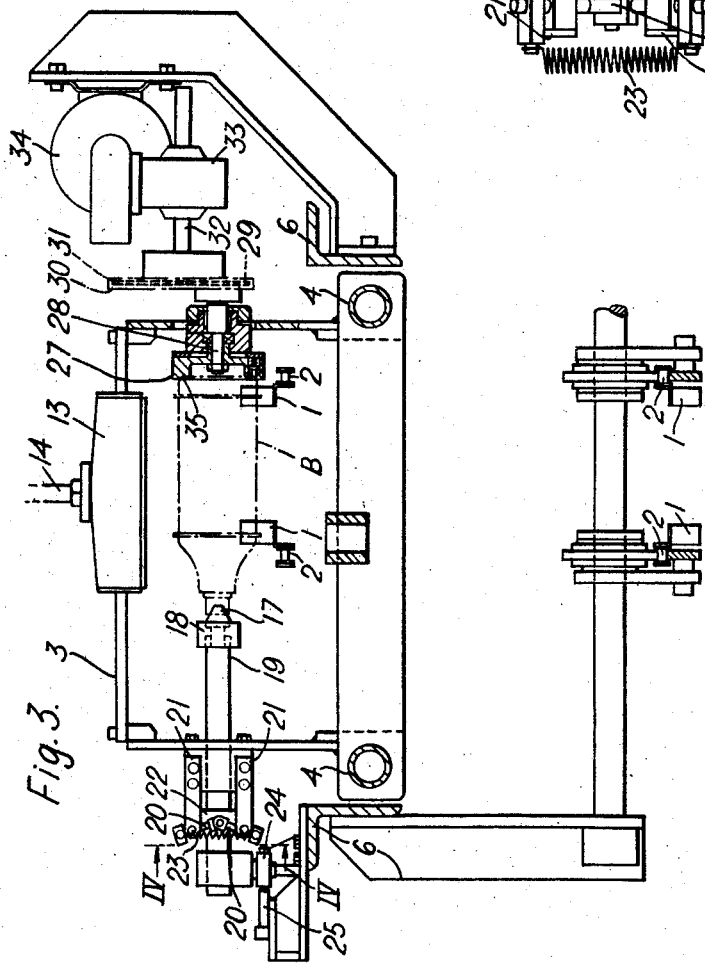

United States Patent Office 3,071,868
Patented Jan. 8, 1963

3,071,868
CURING INK APPLIED TO HOLLOW
PLASTIC ARTICLES
John Kalman, Hemel Hempstead, England, assignor to The Metal Box Company Limited, London, England, a British company
Filed Feb. 29, 1960, Ser. No. 11,716
Claims priority, application Great Britain Mar. 18, 1959
13 Claims. (Cl. 34—105)

This invention relates to the curing of ink applied to hollow plastic articles such as bottles.

The curing of ink freshly applied to hollow plastic articles such as bottles is usually effected in large ovens and it is an object of the present invention to avoid the use of ovens for this purpose and to effect curing by a method which provides the articles with a finish which is shiny as compared with that of articles subjected to curing in an oven.

According to the invention there is provided the method of curing ink applied to hollow plastic articles such as bottles which includes directing a heating medium on to an outer surface of an article to which ink is freshly applied and simultaneously effecting rotation of the article.

Further according to the invention there is provided apparatus for curing ink applied to hollow plastic articles such as bottles, said apparatus including means to support and effect rotation of an article having ink freshly applied to an outer surface thereof, and means to direct a heating medium on to said surface during rotation of the article.

Still further according to the invention there is provided apparatus for curing ink applied to plastic bottles, said apparatus including a succession of carriages movable with an endless conveyor and arranged each to support a bottle having heat-curable ink freshly applied to an outer surface thereof, a heater carriage supported for reciprocation to and from a datum position thereof and lengthwise of the direction of movement of the conveyor, actuating means operable in timed relation with the conveyor to effect movement thereof away from said datum position in the direction of movement of the conveyor at the linear speed of the conveyor and to return the carriage to the datum position, heater means movable with the heater carriage and operable to direct a heating medium on to the ink-bearing surface of a bottle, bottle-engaging means movable with the heater carriage and arranged to raise a bottle from a carriage and to support it for rotation about the axis thereof for heating by the heating medium, and bottle rotating means co-operating with the bottle-engaging means and operable to effect rotation of the bottle during the application of heating medium to the bottle.

In order that the invention may be clearly understood one embodiment thereof will now be described, by way of example, with reference to the accompanying drawings, in which:

FIGURE 1 is a sectional elevation, on line I—I, FIGURE 2, of apparatus according to the invention, FIGURE 2 is a top plan of FIGURE 1, some parts being omitted, FIGURE 3 is a section on line III—III, FIGURE 2, and FIGURE 4 is a section on line IV—IV, FIGURE 3.

In the following description the articles will be referred to as bottles, and it is to be understood that the bottles are made of plastic material, for example of polyethylene, in any suitable manner, for example by enclosing a length of extruded tube in a mould and blowing the tube to the shape of the interior of the closed mould.

The bottles have lettering or decorative matter applied to the sides thereof, in known manner, by the use of ink which, after application to the bottle, is cured by heat.

Referring to the drawings, bottles B to which ink has been freshly applied are delivered from the ink applicator, not shown, one at a time to carriages 1 mounted on an endless conveyor 2 driven continuously from a main shaft, not shown.

A heater carriage 3 is supported by guide rods 4 which extend lengthwise of the upper run of the conveyor and the heater carriage is reciprocable along the rods 4. The rods 4 are supported by brackets 5 secured to the side frames 6, FIGURE 2, for the apparatus. The heater carriage is connected by pivoted links 7, 8 and a roller 9 with a box cam 10 mounted on a cross shaft 11 provided with a sprocket wheel 12, FIGURE 2, by which the shaft is connected with the main shaft, not shown, to be rotatable in timed relation with the conveyor 2. The cam 10 controls reciprocation of the heater carriage.

Three gas burners 13 are supported by the heater carriage and are arranged so that they each extend lengthwise at right angles to the direction of movement of the upper run of conveyor 2 so that the flames emitted therefrom extend lengthwise of the longitudinal axes of bottles located beneath the burners and are radial to said axes. The burners 13 are connected by flexible tubes 14 with a valve 15 operable by a cam 16 rotatable with cross shaft 11 to control the supply of a gas mixture to the burners.

Also mounted on the heater carriage is a bottle pick-up and rotating device comprising three frusto-conical spigots 17, FIGURES 2 and 3, freely rotatable in a spigot support 18 carried by a reciprocable spindle 19 operation of which is controlled by a cam-operated toggle mechanism. The toggle mechanism comprises toggle arms 20 FIGURE 3 pivoted to arms 21 mounted on the heater carriage and to a collar 22 secured to the spindle 19. Springs 23 are arranged to retain the toggle arms 20 in one or other of two positions thereof to which they are moved by co-operation of an operating roller 24 carried by spindle 19 with cams 25, 26, FIGURE 2, mounted on one of the frames 6.

Axially aligned with each of the spigots 17 is a bottle bottom-engaging pad 27. Each pad 27 is supported for rotation with a spindle 28, FIGURE 3, and these spindles have sprocket wheels 29 secured thereto and connected with each other by a chain 30 which also passes round a driving sprocket wheel 31 secured to the shaft 32 of a variable speed gear 33 driven by an electric motor 34 supported by the heater carriage for movement therewith. The face of each pad 27 which faces the spigot 17 appropriated thereto is contoured as at 35, FIGURE 3, to permit the bottom of a bottle to be nested therein for rotation by the pad.

The operation of the apparatus is as follows: When three bottles carried in three successive carriages 1 are disposed in axial alignment with the spigots 17 the heater carriage is in the datum or starting position thereof and movement thereof, to the right as viewed in FIGURE 1, is initiated by cam 10, the heater carriage being caused to move with a linear speed equal to that of conveyor 2. The toggle-operating roller 24 engages cam 25 and moves spindle 19, to the right as viewed in FIGURE 3, so that the spigots 17 enter the mouths of the bottles aligned therewith simultaneously to raise the bottles from the carriages 1, by about 1/16 inch, and to press the bottoms of the bottles against the contoured portions 35 of the pads 27 so that the bottles are rotated about their axes by the pads. At about the same time the cam 16 operates valve 15 so that jets of flame from the burners 13 are directed substantially radially of the axes of the bottles and on to the rotating bottles to effect curing of the ink. As the heater carriage approaches the end of its forward stroke the toggle-operating roller engages cam 26 and effects withdrawal of the spigots 17 from the mouths of the bottles so that the bottles are returned to the carriages 1 from which they were initially raised, and the cam 16 causes the gas flames to be cut-off or reduced. The heater carriage is then returned quickly with a constant acceleration to the datum position thereof in preparation for a further ink curing cycle.

In the foregoing description the heating medium has been described as being a gas flame, if desired however, the heating medium may be hot air directed on to the rotating bottles by air-ejecting nozzles controlled by a suitable valve in a manner similar to that described above.

It will be understood that the surface of the bottles and the ink thereon will attain a relatively high temperature but softening and deformation of the bottles is avoided due to the fact that the heat conductivity of plastics is low and by arranging that the period of exposure of the bottles to the flames is short. It will also be understood that for different plastic materials and inks the interval for curing will differ.

If desired, to reduce the tendency for softening of bottles during ink curing the carriages 1 may move the bottles carried thereby in succession to and past two or more heater carriages each as described above, the spacing between the successive heater carriages being such as to allow a cooling of bottles during movement thereof from one heating station to the next. Further, if desired, the spacing between heating stations may be reduced by applying a cooling medium to the bottles and this may be effected by arranging that at each heating station there is provided a cooling device arranged to apply a cooling medium to the bottles during the application thereto of the heating medium. The cooling device would be disposed at a position remote from that at which the heating device is located and would preferably be diametrically opposite the heating device.

The cooling device may comprise a plurality of cool air injecting nozzles arranged in a line parallel with the axis of rotation of a bottle.

It is to be understood that the heating carriage may be provided with draught excluding means arranged to ensure that draughts do not tend to cause the heating medium to be deflected and that such medium is directed on to an area of predetermined extent.

It is further to be understood that the axes of rotation of bottles may be either vertical or horizontal.

I claim:

1. Apparatus for curing ink applied to plastic bottles, comprising conveyor means operable to move in a predetermined path a succession of plastic bottles decorated with a heat-curable ink, bottle-engaging means operable in timed relation with the conveyor means to remove a bottle from the conveyor means, to move the bottle so removed in a path parallel with that of the conveyor means and at the linear speed of the conveyor means, to effect rotation of the bottle about the axis thereof during movement of the bottle along said parallel path, and to return the bottle to the conveyor means at the end of the movement thereof along said parallel path, and heater means operable in timed relation with the bottle-engaging means to direct a heating medium on to the decorated surface of the bottle during rotation of the bottle, by the bottle-engaging means.

2. Apparatus for curing ink applied to plastic bottles, comprising conveyor means operable to move in a predetermined path a succession of plastic bottles decorated with a heat-curable ink, bottle-engaging means operable in timed relation with the conveyor means to remove a bottle from the conveyor means, to move the bottle so removed in a path parallel with that of the conveyor means and at the linear speed of the conveyor means, to effect rotation of the bottle about the axis thereof during movement of the bottle along said parallel path, and to return the bottle to the conveyor means at the end of the movement thereof along said parallel path, a gas burner operable to direct a flame on to the decorated surfaces of the bottle engaged by the bottle-engaging means, and valve means connected with said burner and operable in timed relation with the bottle-engaging means to cause a flame to be directed on to the bottle during rotation thereof by the bottle-engaging means.

3. Apparatus for curing ink applied to plastic bottles, comprising conveyor means operable ot move in one direciton a succession of plastic bottles decorated with a heat-curable ink, a plurality of bottle-engaging means reciprocable to and from a datum position thereof lengthwise of the path of the conveyor means in timed relation with the movement of the conveyor means, said bottle-engaging means being sequentially operable simultaneously to receive bottles from the conveyor means at said datum position, to rotate the bottles about the axes thereof for a predetermined interval during movement thereof away from said datum position, to return the bottles to the conveyor means at the end of the movement away from the datum position, and to return to the datum position, a plurality of gas burners movable with the bottle-engaging means and aligned one with each of the bottle-engaging means to direct a flame on to the decorated surface of a bottle engaged and rotated thereby, and valve means connected with the burners and operable in timed relation with the bottle-engaging means to control the duration of the application of flames to the bottles.

4. Apparatus for curing ink applied to plastic bottles, said apparatus including a succession of carriages movable with an endless conveyor and arranged each to support a bottle having heat-curable ink freshly applied to an outer surface thereof, a heater carriage supported for reciprocation to and from a datum position thereof and lengthwise of the direction of movement of the conveyor, actuating means operable in timed relation with the conveyor to effect movement of the heater carriage away from said datum position in the direction of movement of the conveyor at the linear speed of the conveyor and to return the carriage to the datum position, heater means movable with the heater carriage and operable to direct a heating medium on to the ink-bearing surface of a bottle, bottle-engaging means movable with the heater carriage and arranged to raise a bottle from a carriage and to support it for rotation about the axis thereof for heating by the heating medium, and bottle-rotating means co-operating with the bottle-engaging means and operable to effect rotation of the bottle during the application of heating medium to the bottle.

5. Apparatus according to claim 4, including a valve connected with the heater means and operable in timed relation with the movements of the heater carriage to control the duration of the application of heating medium to the bottle.

6. Apparatus according to claim 5, wherein the bottle-engaging means comprises a rotatable cam-controlled toggle-operated frusto-conical spigot, and the bottle-rotating means comprises a rotatable pad axially aligned with the spigot, said spigot being supported for axial movement towards and away from said pad in a manner such that the spigot co-operates with an end portion of a bottle to raise it from a carriage and to press the bottle against the pad for rotation thereby.

7. Apparatus according to claim 6, wherein the heater means comprises a gas burner extending lengthwise in a direction at right angles to said direction of movement of said carriages.

8. Apparatus for curing ink applied to plastic bottles, said apparatus including a succession of carriages movable with an endless conveyor and arranged each to support a bottle having heat-curable ink freshly applied to an outer surface thereof, a heater carriage supported for reciprocation to and from a datum position thereof and lengthwise of the direction of movement of the conveyor, actuating means operable in timed relation with the conveyor to effect movement of the heater carriage from said datum position in the direction of movement of the conveyor at the linear speed of the conveyor and to return the carriage to the datum position, heater means movable with the heater carriage and operable to direct a heating medium on to the ink-bearing surface of a bottle, a rotatable pad supported by the heater carriage for movement therewith, a frusto-conical spigot supported by the heater carriage for axial movement towards and away from said pad to co-operate with an end portion of a bottle on a carriage and to raise the bottle from the carriage and press it against said pad, toggle mechanism cam-operated in timed relation with the movement of the heater carriage in the direction of movement of the conveyor for effecting axial movements of the spigot, and pad-rotating means operable in timed relation with the movement of the heater carriage in the direction of movement of the conveyor to effect rotation of the pad while a bottle is raised from the carriage and is pressed against the pad by said spigot.

9. Apparatus according to claim 8, including a valve connected with the heater means and operable in timed relation with the movements of the heater carriage to control the duration of the application of heating medium to the bottle.

10. Apparatus according to claim 9, wherein the heater means comprises a gas burner extending lengthwise in a direction at right angles to said direction of movement of said carriages.

11. Apparatus for curing ink applied to plastic bottles, said apparatus including a succession of carriages movable with an endless conveyor and arranged each to support a bottle having heat-curable ink freshly applied to an outer surface thereof, a heater carriage supported for reciprocation to and from a datum position thereof and lengthwise of the direction of movement of the conveyor, actuating means operable in timed relation with the conveyor to effect movement of the heater carriage away from said datum position in the direction of movement of the conveyor and at the linear speed of the conveyor and to return the carriage to the datum position, a plurality of heater means movable with the carriage and spaced apart lengthwise of the conveyor by the pitch of the carriages, each said heater means being operable to direct a heating medium on to one bottle only, a plurality of rotatable pads, one for each of said heater means, supported by the heater carriage for movement therewith, a plurality of frusto-conical spigots supported for movement with the carriage and for axial movement towards and away from said rotatable pads each of which is axially aligned with one spigot, toggle mechanism cam-operated in timed relation with the movement of the heater carriage in the direction of movement of the conveyor for effecting simultaneous axial movements of all spigots, and pad-rotating means operable in timed relation with the movement of the heater carriage in the direction of movement of the conveyor to effect simultaneous rotation of all pads while bottles are raised from their carriages and are pressed against the pad by said spigots.

12. Apparatus according to claim 11, including a valve connected with the heater means and operable in timed relation with the movements of the heater carriage to control the duration of the application of heating medium to the bottles.

13. Apparatus according to claim 12, wherein the heater means comprises a gas burner extending lengthwise in a direction at right angles to said direction of movement of said carriages.

References Cited in the file of this patent

UNITED STATES PATENTS

| | | |
|---|---|---|
| 1,592,806 | Burnell | July 13, 1926 |
| 2,099,462 | Boax | Nov. 16, 1937 |
| 2,270,132 | Malloy et al. | Jan. 13, 1942 |
| 2,338,071 | Mongan | Dec. 28, 1943 |
| 2,547,884 | Paasche | Apr. 3, 1951 |
| 2,718,714 | Bocchino | Sept. 27, 1955 |
| 2,856,058 | Todd et al. | Oct. 14, 1958 |
| 2,879,883 | Wolford | Mar. 31, 1959 |